US008714536B2

(12) United States Patent
Stadtfeld

(10) Patent No.: US 8,714,536 B2
(45) Date of Patent: May 6, 2014

(54) CRADLE FOR MACHINING OF LARGE PINIONS

(75) Inventor: Hermann J. Stadtfeld, Webster, NY (US)

(73) Assignee: The Gleason Works, Rochester, NY (US)

( * ) Notice: Subject to any disclaimer, the term of this patent is extended or adjusted under 35 U.S.C. 154(b) by 246 days.

(21) Appl. No.: 13/098,518

(22) Filed: May 2, 2011

(65) Prior Publication Data

US 2011/0272872 A1 Nov. 10, 2011

Related U.S. Application Data

(60) Provisional application No. 61/331,549, filed on May 5, 2010.

(51) Int. Cl.
 *B23Q 3/00* (2006.01)
 *B25B 1/24* (2006.01)
 *B23Q 1/52* (2006.01)
 *B23Q 3/06* (2006.01)

(52) U.S. Cl.
 CPC ............ *B23Q 3/00* (2013.01); *B25B 1/2484* (2013.01); *B23Q 1/527* (2013.01); *B23Q 3/062* (2013.01)
 USPC ......... 269/61; 269/287; 269/289 MR; 269/71

(58) Field of Classification Search
 CPC .......... B23Q 1/527; B23Q 3/062; B23Q 3/02; B23Q 3/06; B23Q 3/00; B25B 1/20; B25B 1/2484; B25B 5/147
 USPC ............ 269/104, 127, 129, 287, 289 MR, 58, 269/60, 61, 69, 902
 See application file for complete search history.

(56) References Cited

U.S. PATENT DOCUMENTS

| 814,366 | A | * | 3/1906 | Fertig et al. | 269/59 |
| 1,328,492 | A | * | 1/1920 | Carman | 144/12 |
| 1,389,068 | A | * | 8/1921 | Olson | 269/70 |
| 1,615,860 | A | * | 2/1927 | Williams | 269/76 |
| 2,320,079 | A | * | 5/1943 | Hartwig | 269/69 |
| 2,381,584 | A | * | 8/1945 | Fulleton | 269/43 |
| 2,585,594 | A | * | 2/1952 | Snyder | 269/82 |
| 2,740,331 | A | * | 4/1956 | Schwartz et al. | 409/143 |
| 2,741,830 | A | * | 4/1956 | Lewis | 269/17 |

(Continued)

FOREIGN PATENT DOCUMENTS

FR 2631099 A1 11/1989
JP 2001-137982 A 5/2001

OTHER PUBLICATIONS

International Search Report and Written Opinion for PCT/US2011/034878.

(Continued)

*Primary Examiner* — Lee D Wilson
*Assistant Examiner* — Tyrone V Hall, Jr.
(74) *Attorney, Agent, or Firm* — Robert L. McDowell

(57) ABSTRACT

A cradle device for large pinion gears or blanks wherein a pinion may be supported and rotated for machining. The cradle device comprises one or more adjustable prismatic units each including a plurality of angular plates that are movable toward and/or away from one another along the width of the cradle device in order to raise and lower, and/or laterally shift, a pinion placed thereon so as to position the pinion for machining.

14 Claims, 5 Drawing Sheets

(56) References Cited

U.S. PATENT DOCUMENTS

| | | | | |
|---|---|---|---|---|
| 2,932,995 A * | 4/1960 | Durfee | | 408/115 R |
| 3,038,734 A * | 6/1962 | Else | | 269/129 |
| 3,125,904 A * | 3/1964 | Olivieri | | 408/199 |
| 3,362,295 A * | 1/1968 | Maso et al. | | 409/198 |
| 3,521,875 A * | 7/1970 | Kapelsohn | | 269/58 |
| 3,606,033 A * | 9/1971 | Barilla | | 414/777 |
| 3,851,869 A * | 12/1974 | Damewood | | 269/61 |
| 3,868,101 A * | 2/1975 | Nozaki et al. | | 269/25 |
| 4,340,211 A * | 7/1982 | Chiappetti | | 269/110 |
| 4,445,678 A * | 5/1984 | George | | 269/88 |
| 5,690,323 A * | 11/1997 | Puttmer et al. | | 269/20 |
| 5,904,347 A * | 5/1999 | Lin | | 269/76 |
| 6,065,744 A * | 5/2000 | Lawrence | | 269/287 |
| 6,860,800 B1 * | 3/2005 | Maurer | | 451/364 |

OTHER PUBLICATIONS

Patent Abstracts of Japan, Publication No. 2001-137982 published May 22, 2001.

* cited by examiner

CRADLE FOR MACHINING OF LARGE PINIONS

This application claims the benefit of U.S. Provisional Patent Application No. 61/331,549 filed May 5, 2010 the entire disclosure of which is hereby incorporated by reference.

FIELD OF THE INVENTION

The present invention generally relates to the machining of gears and in particular is directed to a cradle for the machining of large pinions.

BACKGROUND OF THE INVENTION

Gear sets with ring gear diameter of 1000 mm to 2500 mm or even above 2500 mm commonly have pinion shanks which are longer than 1000 mm, e.g., even above 2000 mm. Today, such pinions are held in a vertical position. Upside down clamping is in most cases not possible. Long pinions are clamped on the end, opposite to the pinion head to a rotary table in vertical orientation. This positions the machining zone to the upper area of the vertical travel of a multi-axis machining center, which will deliver reduced stiffness and reduced accuracy. However, in most cases it is impossible to machine pinions with shanks larger than 1500 mm because of the vertical travel limitations of those machines.

It is known to horizontally clamp objects with curved outer surfaces, such a round elongated work pieces, utilizing a V-block (known also as "vee block") as disclosed, for example, in U.S. Pat. No. 4,340,211 to Chiappetti or a pair of V-blocks as disclosed by U.S. Pat. No. 4,445,678 to George. While such devices may be capable of clamping lengths of circular bar stock, the size of the head of a pinion may still be of a magnitude that the capability of axes travel of a multi-axis machining center will still be challenged and reduced stiffness and accuracy will continue to be of concern.

SUMMARY OF THE INVENTION

The present invention is directed to a cradle device for generally cylindrically-shaped workpieces such as large pinion gears or blanks (i.e. pinion workpieces) wherein the pinion workpiece may be supported and rotated for machining. The pinion cradle comprises one or more adjustable prismatic positioning units each including a plurality of angular plates that are movable toward and away from one another along the width of the pinion cradle in order to raise and lower, and/or laterally shift, a pinion placed thereon so as to position the pinion for machining.

DETAILED DESCRIPTION OF THE PREFERRED EMBODIMENT

Figure 1:
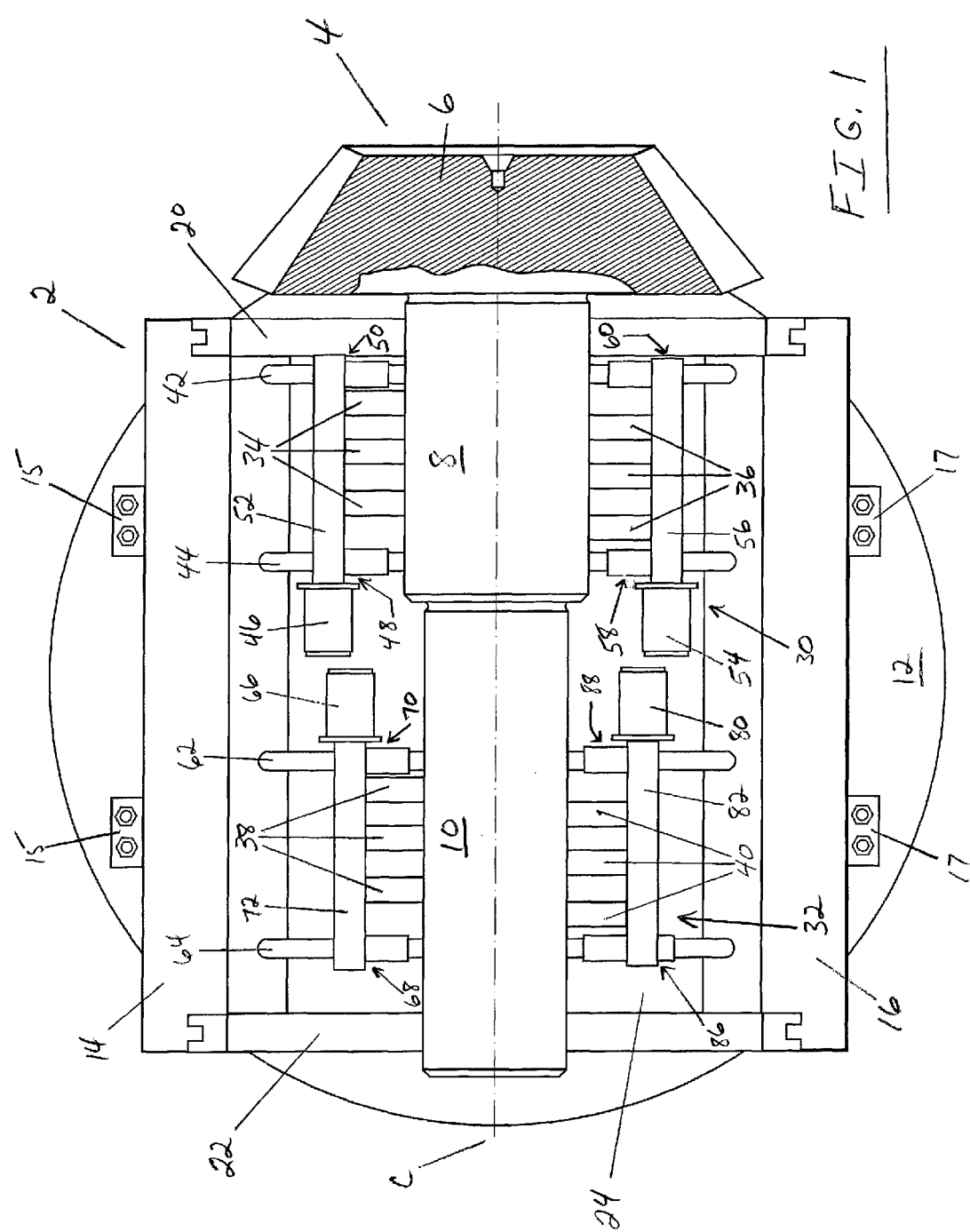
FIG. 1 represents a top view of the pinion cradle of the present invention.

Before any features and at least one construction of the invention are explained in detail, it is to be understood that the invention is not limited in its application to the details of construction and the arrangements of the components set forth in the following description or illustrated in the drawings. The invention is capable of other constructions and of being practiced or being carried out in various ways. Also, it is understood that the phraseology and terminology used herein is for the purposes of description and should not be regarded as limiting.

Figure 2:
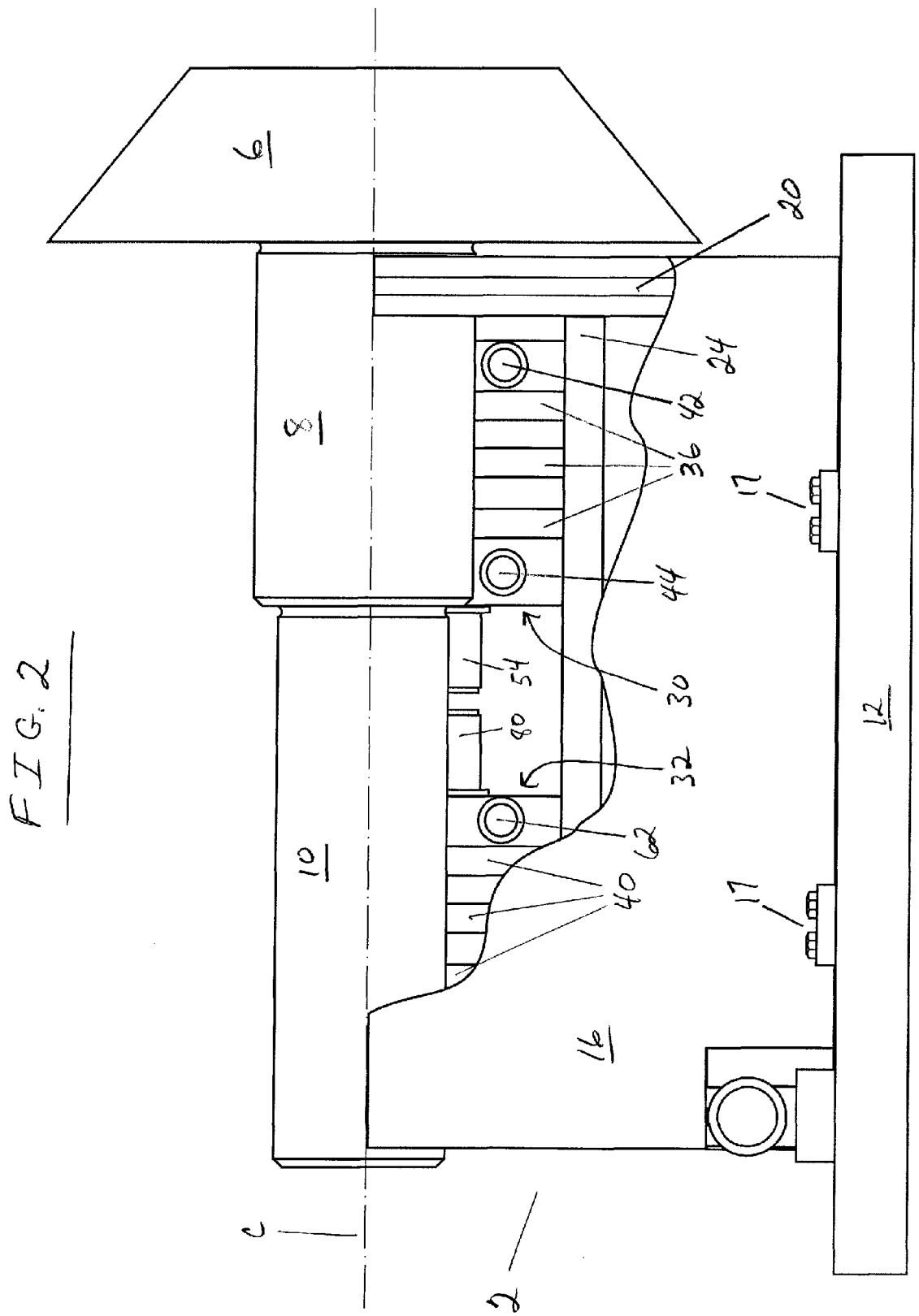
FIG. 2 illustrates a cut-away side view of the inventive pinion cradle.
Figure 3:
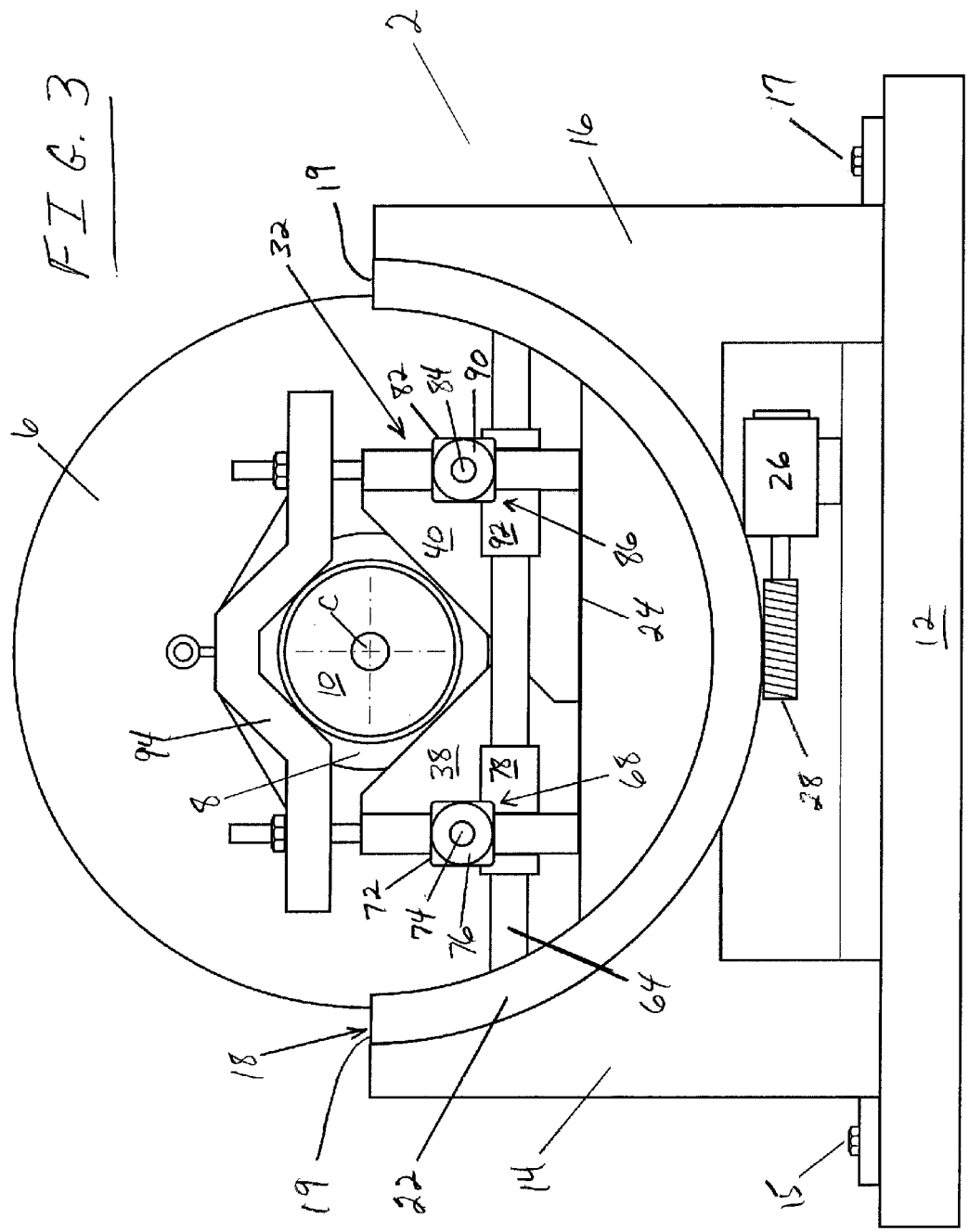
FIG. 3 illustrates a rear view of the inventive pinion cradle

FIGS. 1-3 show the inventive pinion cradle 2 (clamping yokes omitted for viewing clarity in FIG. 1) with a pinion 4 positioned thereon. The pinion cradle has a centerline, C, extending along the lengthwise (axial) direction of the cradle. The pinion 4 comprises a head 6, a first shank portion 8 and a second shank portion 10 with shank portion 8 having a larger diameter than second shank portion 10. It should be understood that the diameter of the pinion shank may be uniform along its entire length or the pinion shank may comprise two or more different diameter portions along its length.

Pinion cradle 2 comprises a base 12, a first support stand 14 and a second support stand 16. First support stand 14 is attached to base 12 via suitable removable attachment means such as a plurality of bolts 15 or by brackets. Second support stand 16 is attached to base 12 via suitable removable attachment means such as bolts 17 or by brackets. Alternatively, support stands 14, 16 may be attached to base 12 via welding or may be formed integral with the base 12 such as by casting as a single unit. Base 12, first support stand 14 and second support stand 16 may be made of cast iron, steel or mineral cast aggregate for example. Pinion cradle 2 can be placed and/or removed by crane or fork truck and may be clamped down with brackets or bolts to the factory floor or to the frame, table or rotary table of a machining center or a gear manufacturing machine.

Pinion cradle 2 further includes an inner rotatable member 18 comprising front arcuate member 20, rear arcuate member 22 and floor member 24. Preferably, arcuate members 20, 22 have the form of a circular arc, most preferably a semi-circle. Arcuate members 20, 22 are positioned for rotation on the inner surface of respective support stands 14, 16. A reversible motor 26 and worm wheel 28 (FIG. 3) may engage with corresponding teeth (e.g. worm gear teeth, not shown) formed in the outer periphery of arcuate member 22 in order to rotate and position the inner rotatable member 18 about centerline, C, for machining and loading/unloading of a pinion 4. Thus, centerline, C, represents the rotational axis of the inner rotatable member 18. Alternatively, motor 26 and worm wheel 28 may engage arcuate member 20 or each arcuate member 20, 22 may be associated with a motor 26 and worm wheel 28. Other means to rotate and position inner rotatable member 18 may be utilized as can be appreciated by the skilled artisan.

Located on floor 24 is at least one, preferably two, adjustable prismatic positioning units 30, 32 arranged along the length of the pinion cradle 2 with each prismatic unit comprising a plurality of alternating and opposing angular plates. Prismatic unit 30 comprises angular plates 34, 36 and prismatic unit 32 comprises angular plates 38, 40. The angular plates 34, 36 and 38, 40 are movable toward and away from one another along the width of the pinion cradle 2 (i.e. generally perpendicular to centerline, C) in order to raise and lower a pinion positioned thereon.

Prismatic unit 30 includes a pair of axially positioned rails 42, 44 between which the angular plates 34, 36 are alternately arranged. Angular plates 34 are moved via motor 46 acting through appropriate means (e.g. worm gears, ball sleeves) at 48 and 50 to move bar 52 in either direction along rails 42, 44. Bar 52 is attached to angular plates 34 thereby moving the angular plates along with the moving bar 52. The drive shaft from motor 46 extending to means 48, 50 may be located within bar 52. Similarly, angular plates 36 are moved via motor 54 in either direction along rails 42, 44. Bar 56 is attached to angular plates 36 thereby moving the angular plates 36 along with the moving bar 56. The drive shaft from motor 54 extending to means 58, 60 may be located within bar 56. It can be seen that movement of angular plates 34, 36 toward one another results in an upward movement of a work piece while movement of angular plates 34, 36 away from one another results in a downward movement of a work piece.

In a similar manner, prismatic unit 32 includes a pair of axially positioned rails 62, 64 between which the angular plates 38, 40 are alternately arranged. Angular plates 38 are moved via motor 66 acting through appropriate means (e.g. worm gears, ball sleeves) at 68 and 70 to move bar 72 in either direction along rails 62, 64. Bar 72 is attached to angular plates 38 thereby moving the angular plates along with the moving bar 72. The drive shaft 74 from motor 66 extending to means 68 (e.g. worm gear 76 and ball sleeve 78 as seen in FIG. 3) and 70 may be located within bar 72. Similarly, angular plates 40 are moved via motor 80 in either direction along rails 42, 44. Bar 82 is attached to angular plates 40 thereby moving the angular plates 40 along with the moving bar 82. The drive shaft 84 from motor 80 extending to means 86 (e.g. worm gear 90 and ball sleeve 92 as seen in FIG. 3) and 88 may be located within bar 82. It can be seen that movement of angular plates 38, 40 toward one another results in an upward movement of a work piece while movement of angular plates 38, 40 away from one another results in a downward movement of a work piece.

Angular plates 34, 36 and 38, 40 are preferably initially positioned relative to one another in accordance with the diameter of a pinion to be positioned in the cradle 2 such that the rotational axis of the pinion is aligned with the centerline, C, of the cradle 2. With respect to the pinion 4 shown in the drawings, it can be seen that given the different diameters of the pinion shank portions 8, 10, angular plates 38, 40 would be positioned closer to one another than would be angular plates 34, 36. Once pinion 4 is placed into cradle 2, adjustment of the position of angular plates 34, 36 and/or 38, 40 may be necessary to achieve the proper axis/centerline alignment. Once aligned, one or more top clamping yokes may be positioned at each prismatic unit 30, 32. Rear top lamping yoke 94 is shown in FIG. 3.

It should also be understood that movement of angular plates 34, 36 (and/or 38, 40) each in the same direction may be utilized to shift the position of a workpiece along the width of the cradle 2.

The rotational actuator (e.g. motor 26) is preferably linked to the control (e.g. CNC) of a machine tool such as a multi-axis machining center. It is also possible to use an individual control which receives a manual or electronic signal for indexing from one pinion tooth slot position to the next. While the cradle is primarily utilized to index between tooth slot positions (i.e. slot spacings), the cradle may also perform partial or complete roll motions. Motors 46, 54, 66 and 80 are also preferably linked to the control of the machine tool but may instead have a separate control at the cradle 2.

A measuring probe can be used to locate the reference surfaces in order to establish the cradle axis in the machine control. The pinion axial position can also be determined with a measuring probe. The cradle can rotate +/−90° and as such will allow every point on a pinion blank to rotate 180° about its axis.

Figure 4:
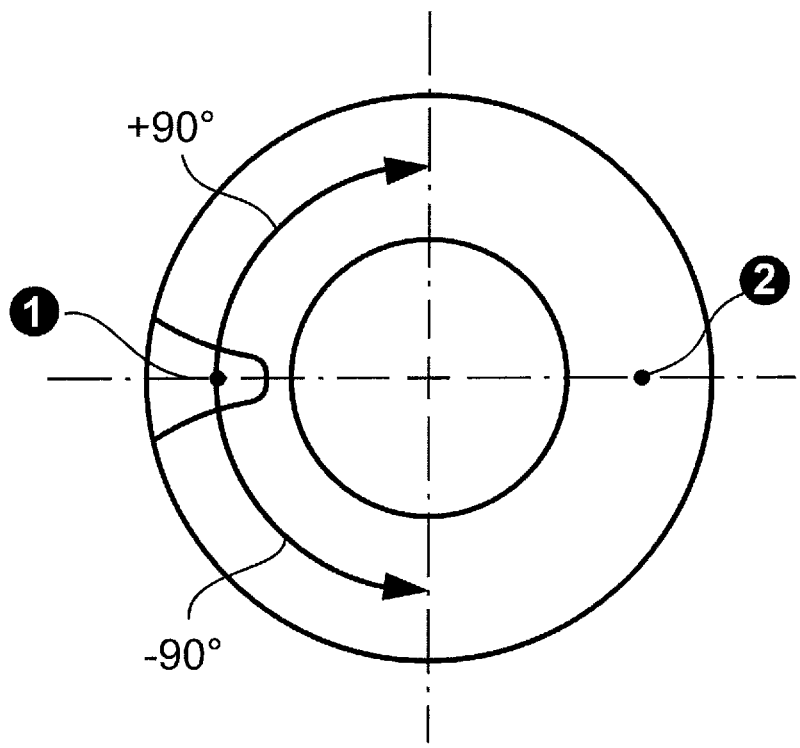
FIG. 4 is an exemplary illustration of two machining zones and the pinion cradle rotational motion for accessing the two machining zones in order to machine all slots of a pinion.

As seen in FIG. 4, if the slot milling area is first (1) for half the number of teeth and if the machining zone is changed from (1) to a zone (2), where (2) is about 180° apart from (1) in a direction around the pinion axis, then the entire circumference of 360° can be reached with a milling or grinding tool in order to machine all the slots of a pinion. The cradle rotation can cover some amount more than +/−90° in order to achieve an overlapping zone between the segments of machining.

Figure 5:
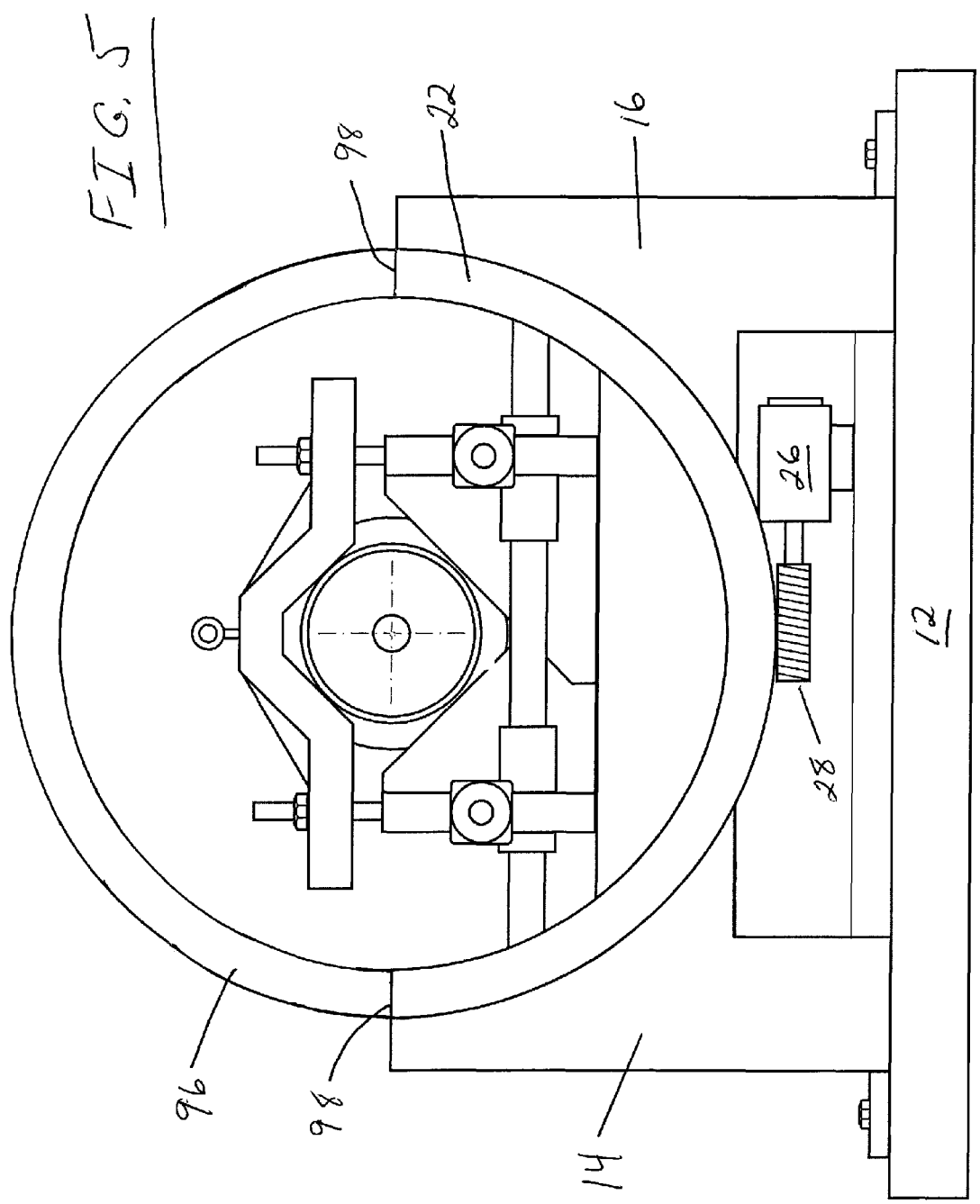
FIG. 5 shows the same view as FIG. 3 with the inclusion of an additional rail segment thereby enabling 360 degree cradle rotation.

As seen in FIG. 5, the present invention further contemplates one or more additional arcuate rail segments 96 (one shown), preferably circular arc-shaped rail segments, mounted above members 20 and/or 22 in order to achieve a 360 degree cradle rotation. The additional arcuate rail segment is connected to members 20 and/or 22 at end surfaces thereof via any suitable connection (e.g. dove-tail) such that a seam 98 formed between members 22 and 96 would pose no hindrance to rotation of a pinion mounted in the cradle 2. Preferably, members 20 and/or 22 are preassembled with the additional arcuate (e.g. circular arc) rail member segment 96 to form a circular rail and then teeth (e.g. worm gear teeth) are formed in the outer periphery of the preassembled circular rail. The circular rail is then disassembled and members 20 and/or 22 are positioned in cradle 2. When desired, additional member 96 is positioned on cradle 2 and an accurate level of transmission across seam 98, suitable for tooth cutting or grinding operations, is realized due to the formation of all circular rail teeth in the preassembled condition.

An advantage of the cradle is the horizontal orientation which allows positioning of the toothed zone in the lower vertical travel range in machines with limited vertical travel. Another advantage of the inventive cradle is the fact that gravity is utilized to hold long pinions tight in the prismatic seating until the centerline adjustment is finished and the pinion is clamped with yokes to the cradle.

It is also possible not to adjust the center line height and orientation and use the results of a measurement of a local machine probe to locate the actual center line and axial pinion position and transform the flank surfaces of the tool paths to the actual location of the pinion, relative to the multi-axis machining center.

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A cradle for supporting and positioning a generally cylindrically-shaped workpiece for machining, said cradle having a centerline extending in a lengthwise direction and comprising:

at least one adjustable prismatic positioning unit comprising a plurality of alternating and opposing angular plates arranged along said lengthwise direction, said angular plates being movable toward and away relative to one another in a direction generally perpendicular to said lengthwise direction whereby said workpiece placed on said angular plates is positionable such that a rotational axis of said workpiece coincides with said centerline of said cradle, said at least one adjustable prismatic positioning unit being rotatable about said centerline.

2. The cradle of claim 1 further including first and second arcuate members rotatable about said centerline, said at least one adjustable prismatic positioning unit being rotatable with said first and second arcuate members.

3. The cradle of claim 2 further comprising a floor member extending between said first and second arcuate members, said at least one adjustable prismatic positioning unit being attached to said floor member.

4. The cradle of claim 2 wherein said first and second arcuate members are in the form of a circular arc.

5. The cradle of claim 4 further including at least one additional circular arc segment is attached to each of said first and second arcuate members whereby a complete circular member is formed.

6. The cradle of claim 2 wherein said first and second arcuate members include teeth on an outer surface thereof.

7. The cradle of claim 6 having at least one of said first arcuate member being rotatable via a first motor and a first gear, said first gear being in mesh with said teeth of said first arcuate member and said second arcuate member being rotatable via a second motor and a second gear, said second gear being in mesh with said second arcuate member.

8. The cradle of claim 1 comprising two adjustable prismatic positioning unit comprising a plurality of alternating and opposing angular plates arranged along said lengthwise direction.

9. The cradle of claim 1 further including top clamping yokes.

10. The cradle of claim 1 further including a means to control the movement of said angular plates and the rotational movement of said at least one adjustable prismatic positioning unit.

11. The cradle of claim 1 being attached to a machine tool having a control means.

12. The cradle of claim 11 wherein the movement of said angular plates and the rotational movement of said at least one adjustable prismatic positioning unit are controlled by the control means of said machine tool.

13. The cradle of claim 1 wherein with respect to a horizontal reference surface, the opposing angular plates are relatively movable toward one another to move a workpiece away from said reference surface, and, the opposing angular plates are relatively movable away from one another to move a workpiece toward said reference surface.

14. The cradle of claim 1 wherein the opposing angular plates are movable together in said direction generally perpendicular to said lengthwise direction whereby said workpiece is movable in said direction generally perpendicular to said lengthwise direction.

* * * * *